(12) United States Patent
Wither et al.

(10) Patent No.: US 9,122,707 B2
(45) Date of Patent: Sep. 1, 2015

(54) METHOD AND APPARATUS FOR PROVIDING A LOCALIZED VIRTUAL REALITY ENVIRONMENT

(75) Inventors: Jason Robert Wither, Topanga, CA (US); Ronald Azuma, Santa Monica, CA (US)

(73) Assignee: Nokia Technologies Oy, Espoo (FI)

(*) Notice: Subject to any disclaimer, the term of this patent is extended or adjusted under 35 U.S.C. 154(b) by 828 days.

(21) Appl. No.: 12/790,288

(22) Filed: May 28, 2010

(65) Prior Publication Data
US 2011/0292076 A1 Dec. 1, 2011

(51) Int. Cl.
G09G 5/04 (2006.01)
G06F 17/30 (2006.01)
G06T 19/00 (2011.01)

(52) U.S. Cl.
CPC ........ *G06F 17/30265* (2013.01); *G06T 19/006* (2013.01); *G06F 2216/13* (2013.01)

(58) Field of Classification Search
CPC .................................................... G06T 19/006
USPC ......................................................... 345/632
See application file for complete search history.

(56) References Cited

U.S. PATENT DOCUMENTS

| | | | | |
|---|---|---|---|---|
| 5,495,576 A * | 2/1996 | Ritchey | ......................... | 345/420 |
| 5,539,483 A * | 7/1996 | Nalwa | ............................. | 353/94 |
| 6,182,010 B1 * | 1/2001 | Berstis | ......................... | 701/441 |
| 6,486,877 B1 * | 11/2002 | Watanabe | ..................... | 345/420 |
| 7,564,469 B2 * | 7/2009 | Cohen | ............................ | 345/632 |
| 7,714,895 B2 * | 5/2010 | Pretlove et al. | ............ | 348/211.2 |
| 7,719,563 B2 * | 5/2010 | Richards | ........................ | 348/36 |
| 2003/0151592 A1 * | 8/2003 | Ritter | ............................. | 345/156 |
| 2004/0189675 A1 * | 9/2004 | Pretlove et al. | ............... | 345/633 |
| 2005/0001852 A1 * | 1/2005 | Dengler et al. | ............... | 345/633 |
| 2005/0226483 A1 * | 10/2005 | Geiger et al. | ................. | 382/128 |

(Continued)

FOREIGN PATENT DOCUMENTS

DE 10 2006 056 874 A1 6/2008
DE 10 2008 01552 A1 10/2009

(Continued)

OTHER PUBLICATIONS

The Effects of Shadow Representation of Virtual Objects in Augmented Reality Natsuki Sugano, Hirokazu Kato, Keihachiro Tachibana Oct. 2003 ISMAR '03: Proceedings of the 2nd IEEE/ACM International Symposium on Mixed and Augmented Reality Publisher: IEEE Computer Society.*

(Continued)

*Primary Examiner* — Javid A Amini
(74) *Attorney, Agent, or Firm* — Alston & Bird LLP (57) ABSTRACT

An apparatus for enabling provision of a localized virtual reality environment may include at least one processor and at least one memory including computer program code. The at least one memory and the computer program code may be configured, with the processor, to cause the apparatus to perform at least receiving information indicative of a current location of a mobile terminal, receiving information indicative of an orientation of the mobile terminal with respect to the current location, causing a stored image including a panoramic view of the current location to be displayed at the mobile terminal based on the orientation, and enabling provision of a virtual object on the panoramic view. A corresponding method and computer program product are also provided.

20 Claims, 6 Drawing Sheets

(56) References Cited

U.S. PATENT DOCUMENTS

| | | | |
|---|---|---|---|
| 2006/0002590 A1 | 1/2006 | Borak | |
| 2006/0241792 A1 | 10/2006 | Pretlove et al. | |
| 2007/0110338 A1* | 5/2007 | Snavely et al. | 382/305 |
| 2007/0192020 A1 | 8/2007 | Brulle-Drews et al. | |
| 2009/0073265 A1* | 3/2009 | Greenhill et al. | 348/148 |
| 2009/0079587 A1* | 3/2009 | Satoh | 340/905 |
| 2009/0278938 A1 | 11/2009 | Shulman | |
| 2009/0289956 A1* | 11/2009 | Douris et al. | 345/633 |
| 2009/0322671 A1 | 12/2009 | Scott et al. | |
| 2009/0325607 A1 | 12/2009 | Conway et al. | |
| 2010/0066750 A1* | 3/2010 | Yu et al. | 345/581 |
| 2010/0103075 A1* | 4/2010 | Kalaboukis et al. | 345/8 |
| 2010/0156906 A1* | 6/2010 | Montgomery et al. | 345/427 |
| 2010/0325563 A1* | 12/2010 | Goldthwaite et al. | 715/757 |
| 2011/0086711 A1* | 4/2011 | Dunko et al. | 463/41 |
| 2011/0151955 A1* | 6/2011 | Nave | 463/2 |
| 2011/0211040 A1* | 9/2011 | Lindemann et al. | 348/36 |
| 2011/0279445 A1* | 11/2011 | Murphy et al. | 345/419 |

FOREIGN PATENT DOCUMENTS

| | | | |
|---|---|---|---|
| EP | 1521216 A1 | 4/2005 | |
| EP | 2022010 A1 | 2/2009 | |
| TW | 200909777 A | 3/2009 | |
| WO | WO 2007/129065 A1 | 11/2007 | |

OTHER PUBLICATIONS

Communication through Virtual Active Objects Overlaid onto the Real World Hiroyuki Tarumi Ken Morishita Yusuke Ito Yahiko Kambayashi ,CVE 2000, San Francisco, CA USA.*

Modern approaches to augmented reality Video files associated with this course are available from the citation page Oliver Bimber, Ramesh Raskar Aug. 2007.*

UIs 101 (devices and techniques)—Doug Bowman, 2009.*

Search Report and Written Opinion for International Application No. PCT/FI2011/050122 mailed Jun. 9, 2011.

Arth, C. et al., *Wide Area Localization on Mobile Phones*, IEEE International Symposium on Mixed and Augmented Reality (2009) 73-82.

Azuma, R., *Tracking Requirements for Augmented Reality*, Communications of the ACM vol. 36, No. 7 (Jul. 1993) 50-51.

Brown, L. D. et al., *Magic Lenses for Augmented Virtual Environments*, IEEE Computer Graphics and Applications, vol. 26, No. 4 (Jul. 2006) 64-73.

Dehais, C. et al., *Augmented Reality through Real-time Tracking of Video Sequences Using a Panoramic View*, The Computer Society, vol. 4 (2004) 4 pages.

Klein, G. et al., *Parallel Tracking and Mopping on a Camera Phone*, IEEE International Symposium on Mixed and Augmented Reality (2009) 83-86.

Milgram, P. et al, *A Taxonomy of Mixed Reality Visual Displays*, IEICE Transactions on Information and Systems, vol. E77-D, No. 12 (1994) 1321-1329.

Quarles, J. et al., *A Mixed Reality Approach for Merging Abstract and Concrete Knowledge*, IEEE Virtual Reality, (2008) 27-34.

Ragan, E. et al., *Simulation of Augmented Reality Systems in Purely Virtual Environments*, IEEE Virtual Reality, (2009) 287-288.

Sprague, D. et al., *The Importance of Accurate VR Head Registration on Skilled Motor Performance*, Graphics Interface, (2006) 131-137.

Steinieke, F. et al., *Does a Gradual Transition to the Virtual World Increase Presence?* IEEE Virtual Reality, (2009) 203-210.

Wagner, D. et al., *History and Future of Tracking for Mobile Phone Augmented Reality*, International Symposium on Ubiquitous Virtual Reality, (2009) 7-10.

Wagner, D. et al., *Pose Tracking from Natural Features on Mobile Phones*, IEEE International Symposium on Mixed and Augmented Reality, (2008) 125-134.

Wagner, D. et al., *Robust and Unobtrusive Marker Tracking on Mobile Phones*, IEEE International Symposium on Mixed and Augmented Reality, (2008) 121-124.

Yong, C. et al., *An Image-Based Virtual Reality Prototype System*, J. of Comput. Sci & Technol., vol. 13, No. 5 (Sep. 1998) 475-480.

* cited by examiner

METHOD AND APPARATUS FOR PROVIDING A LOCALIZED VIRTUAL REALITY ENVIRONMENT

TECHNOLOGICAL FIELD

Embodiments of the present invention relate generally to user interface technology and, more particularly, relate to a method and apparatus for enabling provision of a localized virtual reality environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In some situations, mobile terminals may enhance the interaction that users have with their environment. Numerous use cases have developed around the concept of utilizing mobile terminals to enhance user interaction with their local area such as, for example, virtual tour guides and other mixed reality applications. Mixed reality involves the merging of real and virtual worlds. In some cases, mixed reality involves mixing real world image data with virtual objects in order to produce environments and visualizations in which physical and digital objects co-exist and potentially also interact in real time. Mixed reality includes augmented reality, which uses digital imagery to augment or add to real world imagery, and virtual reality, which simulates real world environments using computer simulation.

When incorporating augmented reality into a particular application or scenario, a user may be enabled to capture a live image or utilize a captured real world image and then add information to the image. A very common example of augmented reality is experienced frequently when watching a sporting event on television with streaming or otherwise intermittently presented score or other status information being overlaid onto the video of the sporting action itself. In the score or status information example described above, the augmentation has almost no relationship with the imagery it is augmenting. Accordingly, the augmentation can simply appear in a fixed location without any regard to what is going on in the real world imagery. However, when a virtual object is to be used to augment an image in the augmented reality situation, and the virtual object is desired to be correlated to a specific object or location within the image, the specific object or location must be tracked so that the virtual object can be positioned properly.

In some examples, the virtual object may act as an annotation that is registered to the specific object. Pixel accurate tracking may then be undertaken to try to ensure that the virtual object stays accurately correlated to the specific object. If the tracking is not accurate, the user may not be enabled to reliably see that which is being annotated. Thus, pixel accurate tracking may be essential to the quality of the user's experience in an augmented reality environment. However, pixel accurate tracking may be difficult in an environment where the user has three degrees of freedom (3DOF), and even harder when the user has six degrees of freedom (6DOF). Accordingly, it may be desirable to provide an alternative mechanism by which to provide a mixed reality experience to users.

BRIEF SUMMARY

A method, apparatus and computer program product are therefore provided for enabling the provision of a mixed reality experience to users using localized virtual reality. For example, some embodiments may utilize information regarding the user's current location and device orientation in order to determine a corresponding panoramic view to display. Digital data such as a virtual object or other type of enhancement may then be displayed with respect to the panoramic view to simplify object tracking issues.

In one example embodiment, a method of providing a localized virtual reality environment is provided. The method may include receiving information indicative of a current location of a mobile terminal, receiving information indicative of an orientation of the mobile terminal with respect to the current location, causing a stored image including a panoramic view of the current location to be displayed at the mobile terminal based on the orientation, and enabling provision of a virtual object on the panoramic view.

In another example embodiment, a computer program product for providing a localized virtual reality environment is provided. The computer program product includes at least one computer-readable storage medium having computer-executable program code instructions stored therein. The computer-executable program code instructions may include program code instructions for receiving information indicative of a current location of a mobile terminal, receiving information indicative of an orientation of the mobile terminal with respect to the current location, causing a stored image including a panoramic view of the current location to be displayed at the mobile terminal based on the orientation, and enabling provision of a virtual object on the panoramic view.

In another example embodiment, an apparatus for providing a localized virtual reality environment is provided. The apparatus may include at least one processor and at least one memory including computer program code. The at least one memory and the computer program code may be configured, with the processor, to cause the apparatus to perform at least receiving information indicative of a current location of a mobile terminal, receiving information indicative of an orientation of the mobile terminal with respect to the current location, causing a stored image including a panoramic view of the current location to be displayed at the mobile terminal based on the orientation, and enabling provision of a virtual object on the panoramic view.

Embodiments of the invention may provide a method, apparatus and computer program product for employment in devices so that, for example, device users may enjoy improved capabilities with respect to applications and services accessible via the device.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 5, which includes

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Existing augmented reality environments in which unlimited processing resources are available may attempt to perform pixel level object tracking in order to provide a relatively realistic enhancement for mixed reality presentation purposes. However, for devices with limited processing resources, such as many mobile terminals, performing pixel level tracking may not be practical or desirable. As such, some applications may attempt to use built in accelerometers and/or magnetometers to give an approximation of user orientation and use a positioning sensor for location. Some alternatives may use tracking in limited or pre-prepared environments using either standard fiducials or natural features. However, these options may, in some cases, limit the environments in which tracking of objects for augmentation may be practiced.

For some environments, the addition of content as an overlay, virtual removal of objects, or the replacement of certain objects with others may be accomplished by inserting virtual content into a live image of the environment. However, without pixel level tracking, the addition of the content may sometimes not appear natural or the added content may not look like it actually belongs to the presented scene. This phenomenon may manifest itself as a mis-registration between a real world object (or objects) and a corresponding virtual object (or objects).

However, the common experience of most camera users is that the image of a particular scene as seen through the user's eye is different than the image seen on a display pointing roughly in the same direction. Accordingly, replacing a live or current real world panoramic view image with a stored panoramic view image taken previously at nearly the same location and orientation is likely to produce an image that is perceptually agreeable to most users in that the small differences in perspective that may result may not be much different than the user would expect due to normal differences the user has experienced in the past. Moreover, tracking real objects and correlating virtual objects to the real objects may actually be much easier with respect to the stored image than it would be for the real image.

Figure 5A:
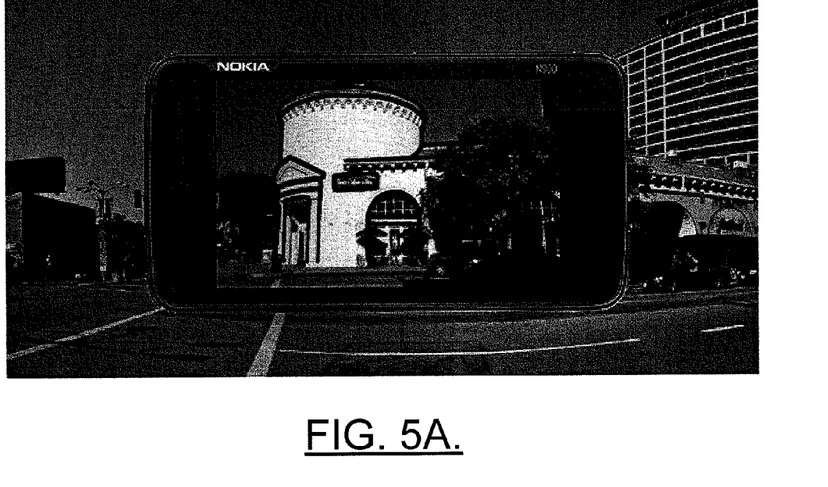
FIGS. 5A, 5B and 5C, illustrates an example of how image alignment can impact an augmented reality environment relative to the impact that may be experienced for an example embodiment employing localized virtual reality.
Figure 5B:
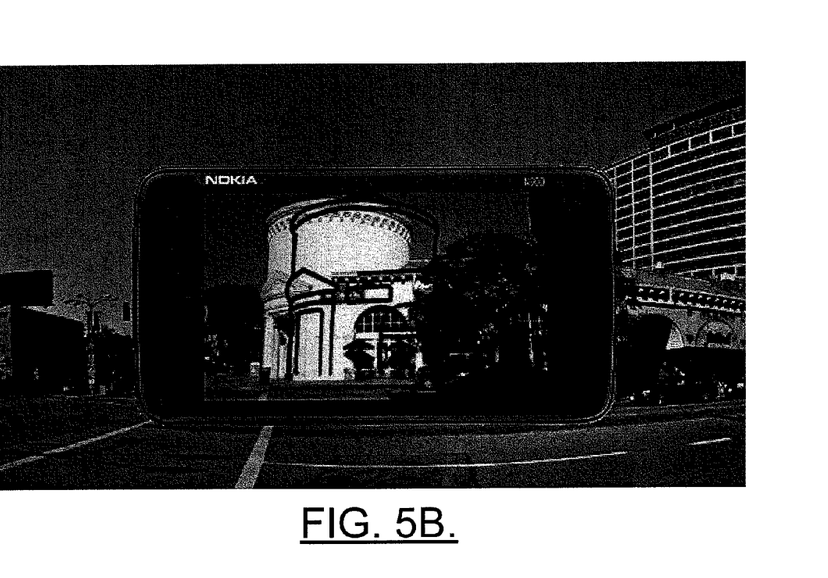
Figure 5C:
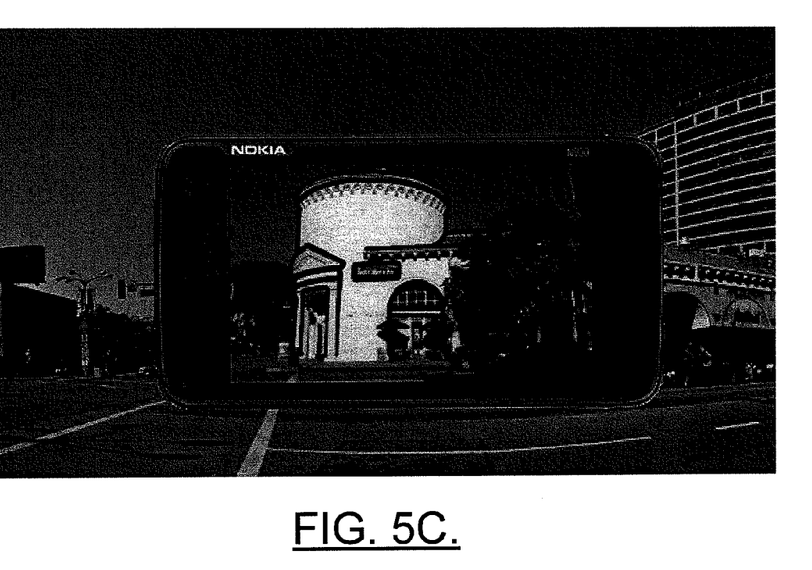

FIG. 5, which includes FIGS. 5A, 5B and 5C, illustrates an example of how image alignment can impact an augmented reality environment relative to the impact that may be experienced for an example embodiment employing localized virtual reality. In this regard, FIG. 5A shows a situation in which the image displayed is well aligned with respect to the real world objects depicted in the image. FIG. 5A also shows outlining of certain features of the main structure shown in the image. In a perfectly aligned case, whether the image is augmented reality or localized virtual reality of an example embodiment, there is good correlation between the outlining and the actual features in the image.

FIG. 5B shows what can happen in an augmented reality case where tracking is poor. In this regard, although a live image is shown in FIG. 5B, the tracking between the live image of the main structure of the image and the outlining is poor. The poor tracking may result from user motion or changes in orientation that may, perhaps due to low processing power, cause tracking lapses that leave the outlining or other virtual object appearing to float in space. The floating appearance of virtual objects may degrade the overall user experience and reduce service quality.

Meanwhile, FIG. 5C illustrates an embodiment where, instead of a live image, the display shows a stored panoramic image taken at approximately the same location and at approximately the same orientation. By viewing the background, it can be appreciated that the device is not aligned exactly as it was previously. Thus, although the image displayed is the same as was displayed in FIGS. 5A and 5B, the image is not properly aligned with the actual background. Despite this lack of alignment, the main structure is relatively easily tracked within the displayed image and thus the outlining can be displayed and aligned appropriately, likely with less processing than is normally required for an augmented reality scenario.

Some embodiments of the present invention may be employed to, for example, provide an ability for a mobile terminal to present a localized virtual reality display that is equipped to simplify the tracking issues that can be problematic in an augmented reality environment. In some examples, information regarding the user's current location may be used along with information indicative of the orientation the user's device in order to determine a corresponding panoramic view to display. A virtual object or other type of enhancement may then be displayed with respect to the panoramic view to simplify object tracking. An augmented display may therefore be provided with respect to the panoramic view.

Figure 1:
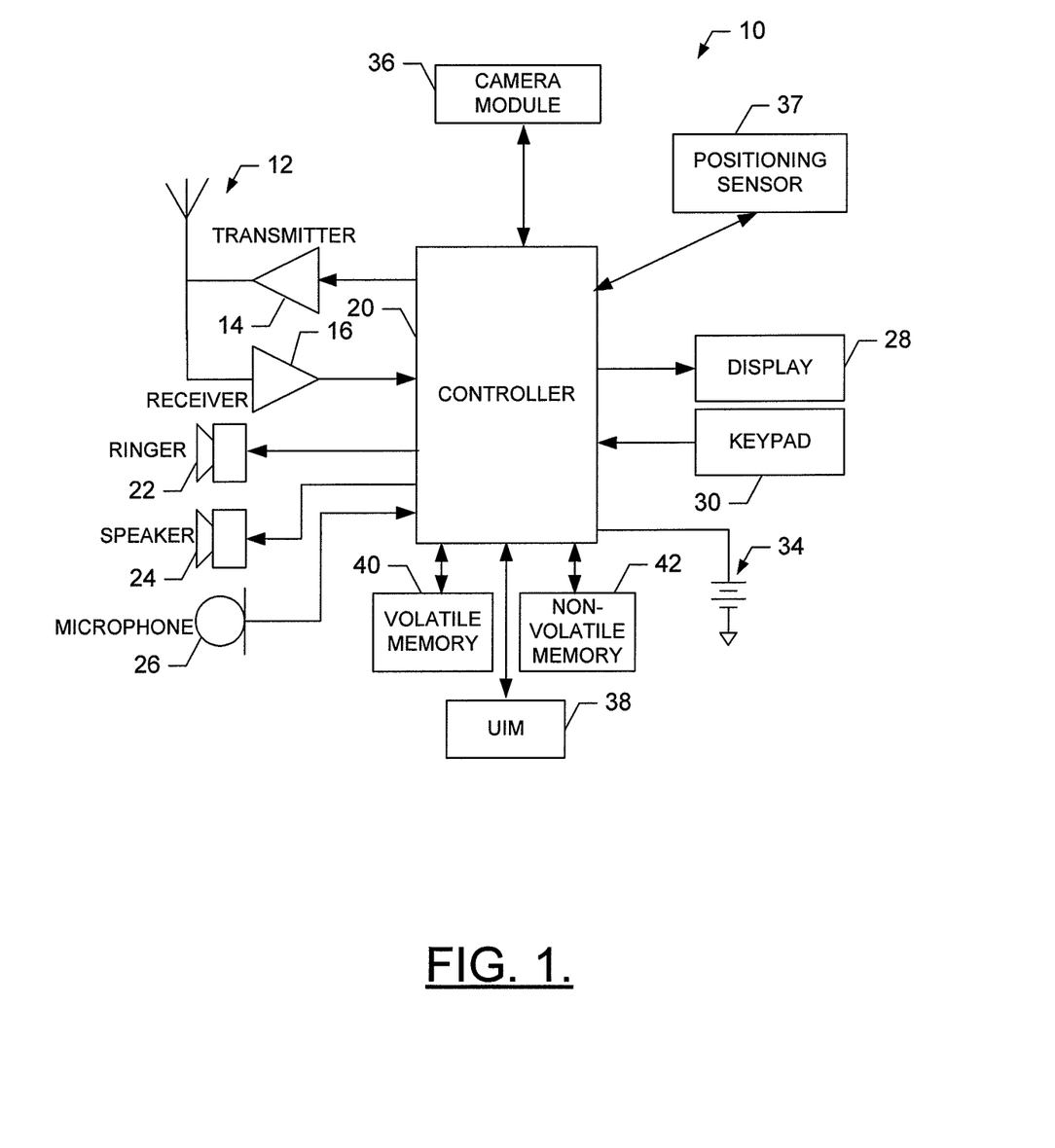
FIG. 1 is a schematic block diagram of a mobile terminal according to an example embodiment of the present invention.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown), a microphone or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

In some embodiments, the mobile terminal 10 includes a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an example embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format or another like format. In some cases, the camera module 36 may provide live image data to the display 28. Moreover, in an example embodiment, the display 28 may be located on one side of the mobile terminal 10 and the camera module 36 may include a lens positioned on the opposite side of the mobile terminal 10 with respect to the display 28 to enable the camera module 36 to capture images on one side of the mobile terminal 10 and present a view of such images to the user positioned on the other side of the mobile terminal 10.

In addition, the mobile terminal 10 may include a positioning sensor 37. The positioning sensor 37 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 37 may include a pedometer or inertial sensor. In this regard, the positioning sensor 37 may be capable of determining a location of the mobile terminal 10, such as, for example, longitudinal and latitudinal directions of the mobile terminal 10, or a position relative to a reference point such as a destination or start point. Information from the positioning sensor 37 may then be communicated to a memory of the mobile terminal 10 or to another memory device to be stored as a position history or location information. In this regard, for example, the position history may define a series of data points corresponding to positions of the mobile terminal 10 at respective times. Various events or activities of the mobile terminal 10 may also be recorded in association with position history or location information provided by the positioning sensor 37.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
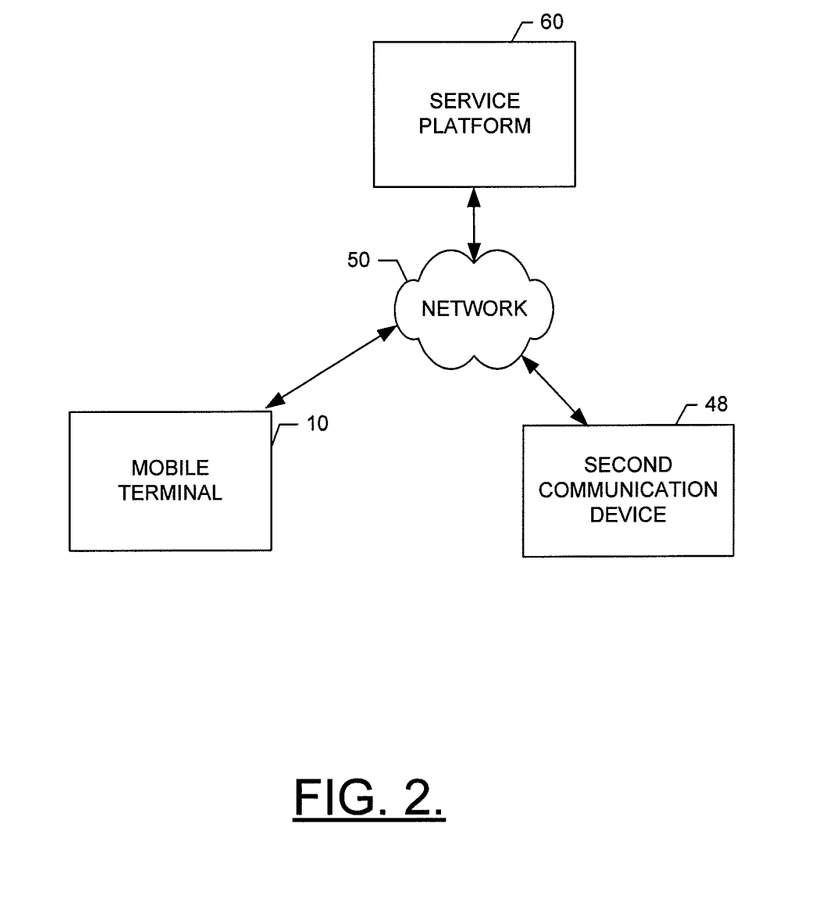
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention includes a first communication device (e.g., mobile terminal 10) and in some cases also a second communication device 48 that may each be capable of communication with a network 50. The second communication device 48 is provided as an example to illustrate potential multiplicity with respect to instances of other devices that may be included in the network 50 and that may practice example embodiments. The communications devices of the system may be able to communicate with network devices or with each other via the network 50. In some cases, the network devices with which the communication devices of the system communicate may include a service platform 60. In an example embodiment, the mobile terminal 10 (and/or the second communication device 48) is enabled to communicate with the service platform 60 to provide, request and/or receive information. However, in some embodiments, not all systems that employ embodiments of the present invention may comprise all the devices illustrated and/or described herein.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like.

One or more communication terminals such as the mobile terminal 10 and the second communication device 48 may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 48 via the network 50. By directly or indirectly connecting the mobile terminal 10, the second communication device 48 and other devices to the network 50, the mobile terminal 10 and the second communication device 48 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 48, respectively.

Furthermore, although not shown in FIG. 2, the mobile terminal 10 and the second communication device 48 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 48 may be enabled to communicate with the network 50 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 60 may be a device or node such as a server or other processing device. The service platform 60 may have any number of functions or associations with various services. As such, for example, the service platform 60 may be a platform such as a dedicated server (or server bank) associated with a particular information source or service (e.g., a localized virtual reality service, a mapping service, a search service, etc.), or the service platform 60 may be a backend server associated with one or more other functions or services. As such, the service platform 60 represents a potential host for a plurality of different services or information sources. In some embodiments, the functionality of the service platform 60 is provided by hardware and/or software components configured to operate in accordance with known techniques for the provision of information to users of communication devices. However, at least some of the functionality provided by the service platform 60 is information provided in accordance with example embodiments of the present invention.

In an example embodiment, the service platform 60 may host an apparatus for providing a localized virtual reality service and/or may host an image provision service that provides panoramic images to a device practicing an embodiment of the present invention. As such, in some embodiments, the service platform 60 may itself perform example embodiments, while in other embodiments, the service platform 60 may facilitate (e.g., by the provision of image data) operation of an example embodiment at another device (e.g., the mobile terminal 10 and/or the second communication device 48). In still other example embodiments, the service platform 60 may not be included at all.

An example embodiment will now be described with reference to FIG. 3, in which certain elements of an apparatus for enabling the provision of a localized virtual reality environment are displayed. The apparatus of FIG. 3 may be employed, for example, on the mobile terminal 10 of FIGS. 1 and 2 (or the second communication device 48). However, it should be noted that the apparatus of FIG. 3, may also be employed on a variety of other devices such as the service platform 60 of FIG. 2. Therefore, example embodiments should not be limited to application on devices such as the mobile terminal 10 of FIG. 1. Alternatively, embodiments may be employed on a combination of devices including, for example, those listed above. Accordingly, some example embodiments may be embodied wholly at a single device (e.g., the mobile terminal 10 or the service platform 60) or by devices in a client/server relationship (e.g., the service platform 60 serving information to the mobile terminal 10). Furthermore, it should be noted that the devices or elements described below may not be mandatory and thus some may be omitted in certain embodiments.

Figure 3:
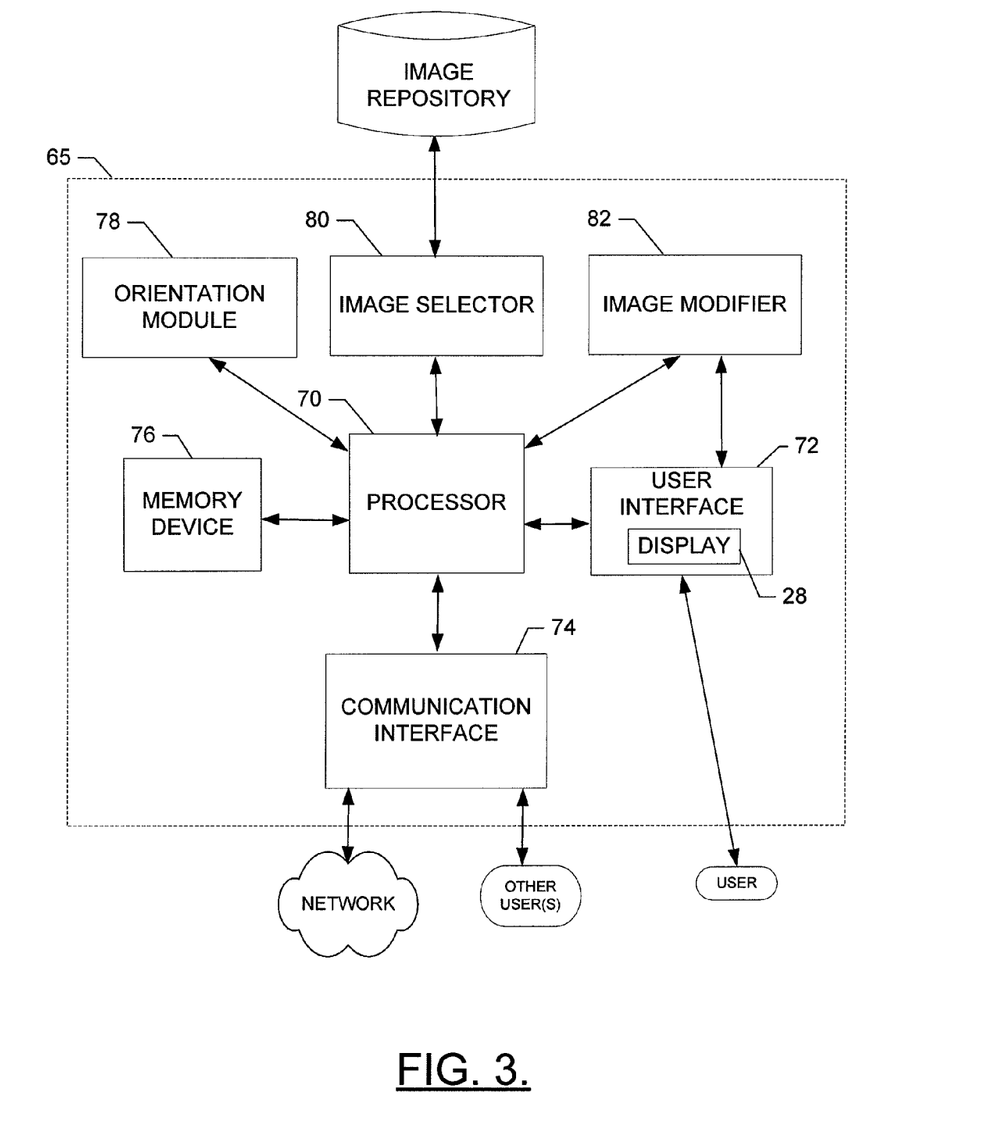
FIG. 3 is a schematic block diagram of an apparatus for providing a localized virtual reality environment according to an example embodiment of the present invention.

Referring now to FIG. 3, an apparatus 65 for enabling the provision of a localized virtual reality environment is provided. The apparatus 65 may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 (which may be an example of the controller 20 of FIG. 1) may be embodied in a number of different ways. For example, the processor 70 may be embodied as one or more of various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing embodiments of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus 65 is embodied as a server or some other network devices, the user interface 72 may be limited, or eliminated. However, in an embodiment in which the apparatus 65 is embodied as a communication device (e.g., the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 65 may further include (or be in communication with) an orientation module 78. As such, when the apparatus 65 is embodied at the mobile terminal 10, the orientation module 78 may be a part of the mobile terminal 10. However, in embodiments in which the apparatus 65 is embodied at the service platform 60, the orientation module 78 may be remotely located at the mobile terminal 10. The orientation module 78 may be any means such as a device or circuitry embodied in either hardware or a combination of hardware and software that is configured to determine the orientation of mobile terminal 10 and/or of the field of view of the camera module 36 of the mobile terminal 10.

Orientation module 78 may be configured to determine the orientation of mobile terminal 10 relative to a reference. In some cases, the reference may be a particular direction, such as North or another cardinal direction. However, other references could also be employed. As such, in some embodiments, the orientation module 78 may include a compass or other orientation sensor configured to determine the heading of the mobile terminal 10 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation.

In an example embodiment, the orientation of the field of view of the camera module 36 may be compared to the reference in order to determine the current orientation of the mobile terminal 10. Thus, for example, given an initial image, a particular feature may be selected as the reference. Thereafter, as the field of view is altered, the orientation module 78 may be configured to determine the orientation of the field of view of the camera module 36 based on the speed or amount of movement relative to the reference. While some embodiments may only determine orientation in a single plane (e.g., parallel to the surface of the earth), other embodiments may allow for orientation determination including an elevation aspect and/or axial aspect shifts. Thus, for example, the orientation module 78 may be configured to determine pitch and/or yaw of the mobile terminal 10 (e.g., pitch defining a degree of elevation and yaw defining an axial rotation). As such, for example, the orientation module 78 may include a device or other means for determining the orientation of the mobile terminal 10 (or the field of view of the camera module 36), which may be referred to as orientation information. In some embodiments, the orientation module 78 may include an electronic compass, a horizon sensor, gravity sensor, accelerometer, gyroscope, magnetometer and/or the like or any other sensor that may be useful in determining orientation information. Thus, the orientation module 78 may be any means, device or circuitry for determining the orientation of mobile terminal 10.

In an example embodiment, the processor 70 may be embodied as, include or otherwise control an image selector 80 and an image modifier 82. As such, in some embodiments, the processor 70 may be said to cause, direct or control the execution or occurrence of the various functions attributed to the image selector 80 and the image modifier 82, respectively, as described herein. The image selector 80 and the image modifier 82 may each be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the image selector 80 and the image modifier 82, respectively, as described herein. Thus, in examples in which software is employed, a device or circuitry (e.g., the processor 70 in one example) executing the software forms the structure associated with such means.

In an example embodiment, the image selector 80 may be configured to receive position information indicative of the current location (or position) of the mobile terminal 10 (e.g., from the position sensor 36). The image selector 80 may also be configured to receive orientation information indicative of an orientation of the mobile terminal with respect to the current location. In other words, the image selector 80 may also receive orientation information indicative or descriptive of the orientation of the mobile terminal 10 (relative to a reference) so that a field of view that the mobile terminal 10 would be expected to have at the current location may be determined based on the current location and the orientation information. The image selector 80 may then retrieve (or request) an image from an image repository 84 that correlates to both the current location and the orientation information. Notably, the image from the image repository may be a stored panoramic image previously captured at approximately the same location and/or orientation. However, in some embodiments, the image may actually be a stored panoramic view that represents a virtual view of approximately the same location and/or orientation. As such, for example, in some cases the image could be a complete textured model of the environment around the user that has been generated to approximate the environment that is currently present, that represents a past or future time, or that represents an imaginary modification of the location.

The image repository 84 may be a portion of the memory device 76 or may be an external memory or database that includes a plurality of images. In embodiments in which the image repository 84 is collocated with the image selector 80 at the apparatus 65 (e.g., at the mobile terminal 10 or at the service platform 60), the image repository 84 may be a portion of the memory device 76. However, for example, in embodiments where the image repository 84 is remotely located (e.g., when the apparatus 65 is at the mobile terminal 10, but the image repository 84 is at the service platform 60), the image repository 84 may not be a portion of the memory device 76.

The images stored in the image repository 84 may be panoramic images that are associated with particular locations and orientations. Thus, upon receiving information indicative of the current location and orientation, the image selector 80 may be equipped to select (or request) a corresponding panoramic image from the image repository 84 that provides an image captured previously at approximately the same location with approximately the same orientation. In some cases, the panoramic images may be images associated with an existing mapping service that may be publicly available via the Internet. However, in other cases, the panoramic images may be a private collection of images associated with a particular location, area, business, museum, tour, or entity.

In some embodiments, the image selector 80 may select a particular image from the image repository 84 after receipt of the location information and the orientation information. However, in other embodiments, some images may be pre-fetched based on location information, perhaps before orientation information is known or before a specific panoramic image is requested. The pre-fetched images may be received from a remote source and stored locally so that computation resource consumption may be reduced when searching for a specific image to match the current location and orientation information when it is time to retrieve a panoramic image since a smaller set of images may need to be dealt with during the search operation.

In some cases, the image repository 84 may include multiple images associated with the same location and orientation. For example, multiple images having different lighting conditions may be stored in association with each respective location and orientation in order to enable images to be retrieved that correspond to the current time of day (e.g., day, night, morning, evening, etc.) and/or the current weather conditions (e.g., cloudy, sunny, rainy, etc.). As such, the image selector 80 may reference information sources such as weather reports and/or a local clock in association with retrieving or requesting specific panoramic images from the image repository 84.

The image modifier 82 may be configured to provide for the inclusion of a virtual object in a panoramic image selected by the image selector 80. Thus, for example, the image modifier 82 may be configured to provide for the inclusion of virtual data such as an annotation or other virtual object with the panoramic view defined by the panoramic image. As such, for example, the image modifier 82 may be configured to track a location of an object within the panoramic image and either replace the object with the virtual object, cover the object (or a portion of the object) with the virtual object, or position the virtual object relative to the object. Moreover, in some embodiments, the object may be essentially removed from the image (e.g., by covering or replacing the object with a virtual object that is configured to look like the background or structure behind the object being "removed"). Furthermore, the image modifier 82 may be configured to present (or provide for presentation) a modified image for rendering at the user interface 72. The modified image may include the panoramic image selected as corresponding to the current location and orientation as modified by the image modifier 82 with one or more virtual objects overlaid or otherwise included with the panoramic image.

In some embodiments, the virtual object may be an object defined or selected by the user. For example, in some cases, the user may design a graphical element or define text or some other image that is to act as the virtual object. However, in other cases, the user may select a graphical element, text, an object from an image or any other visually perceptible object for use as the virtual object. Once the virtual object is defined (or perhaps multiple virtual objects have been defined), the virtual object may be placed on the panoramic image (e.g., as an overlay) at a location selected by the user or at a location associated with a particular real object or feature within the panoramic image. As such, in some embodiments, the image modifier 82 may be configured to associate the virtual object with an object within the panoramic view. In other words, the virtual object may be registered to the object in order to be associated with the object regardless of the view change or the change in position of the object relative to the current field of view. Thus, for example, if the position of the object in the field of view moves (e.g., due to motion of the mobile terminal 10 or due to changing of orientation of the mobile terminal 10), the position of the virtual object may change correspondingly within the current field of view. Additionally, if the position of the mobile terminal 10 changes such that the scale of the object changes (e.g., if the user moves away from the object or closer to the object), the image modifier 82 may be configured to adjust the scale of the virtual object accordingly.

Thus, for example, if the object is a building or sign and the virtual object is a banner or graphical element to be placed on the object or over the sign, the virtual object may be scaled to fit on or over the object from the image. Tracking of the object (e.g., by the image modifier 82) may be much easier than tracking of the object within a live image. Thus, correlating the virtual object to the object in image data that is provided for presentation at the display 28 may be handled with less processing power than is required for an augmented reality presentation of the virtual object over a live image. However, since the panoramic image may be selected as an image approximating the view that would likely be presented if a live image were displayed anyway, the user may still have a positive experience with respect to the localized virtual reality environment presented on the display 28. As such, some embodiments may essentially replace the real panoramic view with a virtual panoramic view, which may be a time shifted panoramic view by virtue of the virtual panoramic view being a previously stored image of approximately the same location (with approximately the same orientation). Thus, example embodiments may essentially provide a reality shift that will not be perceptible to typical users to an extent that causes disappointment with the experience. Example embodiments may therefore provide for content (e.g., virtual objects) to be tailored to the panoramic view that has been selected without concern over registration error due to tracking difficulties. The content may therefore be overlaid with less error and/or without being occluded by real world objects.

Accordingly, example embodiments may be used to modify images of particular locations with advertisements or personalized content. Alternatively or additionally, images of particular locations may be modified to include representations of past objects (including buildings, vegetation, historical objects, people and/or the like) that correspond to the way the particular location may have appeared in the past. Similarly, a particular location may be modified to illustrate potential future objects to guess at what the location may look like in the future. Numerous other business-related, entertainment-related, or social content sharing-related uses may also be realized using various example embodiments.

Accordingly, in some embodiments, a device display may be enabled to provide a localized virtual reality environment in which a panoramic image taken previously at a location near the current location and with a device orientation similar to the current location is used as the basis for the mixed reality display presentation. The panoramic image may replace a live image for use in presentation of the localized virtual reality environment. However, since the display presents a localized virtual reality environment on a stored image, the device providing the display need not actually even have a camera itself in some cases. By using a stored panoramic image, tracking may be less complex than using a live image and virtual objects may be more reliably presented in a fashion that consistently enhances the user experience.

Figure 4:
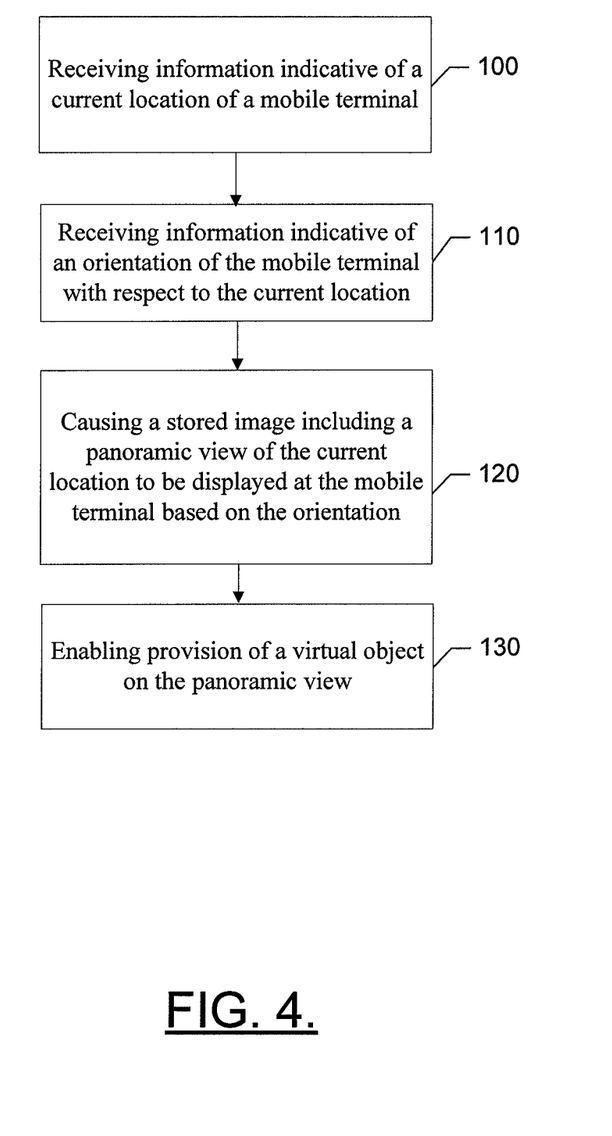
FIG. 4 is a block diagram according to an example method for providing a localized virtual reality environment according to an example embodiment of the present invention.

FIG. 4 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instructions for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method for enabling provision of a localized virtual reality environment may include receiving information indicative of a current location of a mobile terminal at operation 100 and receiving information indicative of an orientation of the mobile terminal with respect to the current location at operation 110. The method may further include causing a stored image including a panoramic view of the current location to be displayed at the mobile terminal based on the orientation at operation 120 and enabling provision of a virtual object on the panoramic view at operation 130.

In some embodiments, certain ones of the operations above may be modified or further amplified as described below. Modifications or amplifications to the operations above may be performed in any order and in any combination. In this regard, for example, causing the stored image to be displayed may include selecting the stored image from among a plurality of previously captured images. Each of the previously captured images may be associated with a corresponding location and orientation. In some embodiments, causing the stored image to be displayed may include selecting the stored image from among a plurality of previously captured images pre-fetched from a remote device and locally stored. In such an example, the images that are pre-fetched may be selected based on a proximity of each pre-fetched image relative to the current location. In some embodiments, enabling provision of the virtual object may further include associating the virtual object with a corresponding real object within the panoramic view. In some cases, enabling provision of the virtual object may include replacing a real object with the virtual object, removing the real object, or overlaying the real object with the virtual object. In an example embodiment, receiving information indicative of the orientation of the mobile terminal may include comparing a reference point in a live image to a prior position of the reference point in a previously captured image or frame. In some embodiments, receiving information indicative of the current location of the mobile terminal and receiving information indicative of the orientation of the mobile terminal may occur at a device remote with respect to the mobile terminal and causing the stored image to be displayed may include providing the stored image from the device to the mobile terminal.

In an example embodiment, an apparatus for performing the method of FIG. 4 above may comprise one or more processors (e.g., the processor 70) configured to perform some or each of the operations (100-130) described above. The processor may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, corresponding ones of the processor 70, the image selector 80, the image modifier 82 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:

receive information indicative of a current location of a mobile terminal;

receive information indicative of an orientation of the mobile terminal with respect to the current location;

select a stored image including a panoramic view of the current location from among a plurality of images of the current location having different lighting conditions, wherein the stored image is selected based upon a current time of day or current weather condition such that the lighting condition of the stored image corresponds to the current time of day or the current weather condition;

cause the stored image including the panoramic view of the current location to be displayed at the mobile terminal based on the orientation; and enable provision of a virtual object on the panoramic view by associating the virtual object with a corresponding real object within the panoramic view.

2. The apparatus of claim 1, wherein the memory and computer program code are configured to, with the processor, cause the apparatus to cause the stored image to be displayed by further selecting the stored image from among a plurality of previously captured images, each of the previously captured images being associated with a corresponding location and orientation.

3. The apparatus of claim 1, wherein the memory and computer program code are configured to, with the processor, cause the apparatus to cause the stored image to be displayed by further selecting the stored image from among a plurality of previously captured images pre-fetched from a remote device and locally stored, the images pre-fetched being selected based on a proximity of each pre-fetched image relative to the current location.

4. The apparatus of claim 1, wherein the memory and computer program code are configured to, with the processor, cause the apparatus to enable provision of the virtual object by replacing a real object with the virtual object or removing the real object.

5. The apparatus of claim 1, wherein the memory and computer program code are configured to, with the processor, cause the apparatus to receive information indicative of the orientation of the mobile terminal by comparing a reference point in a live image to a prior position of the reference point in a previously captured image or frame.

6. The apparatus of claim 1, wherein the apparatus is remotely located from the mobile terminal such that receiving information indicative of the current location of the mobile terminal and receiving information indicative of the orientation of the mobile terminal occurs at a device remote with respect to the mobile terminal and wherein causing the stored image to be displayed comprises providing the stored image from the device to the mobile terminal.

7. The apparatus of claim 1, wherein the apparatus is a mobile terminal and further comprises user interface circuitry configured to facilitate user control of at least some functions of the mobile terminal.

8. A method comprising:

receiving information indicative of a current location of a mobile terminal;

receiving information indicative of an orientation of the mobile terminal with respect to the current location;

selecting a stored image including a panoramic view of the current location from among a plurality of images of the current location having different lighting conditions, wherein the stored image is selected based upon a current time of day or current weather condition such that the lighting condition of the stored image corresponds to the current time of day or the current weather condition;

causing the stored image including the panoramic view of the current location to be displayed at the mobile terminal based on the orientation; and enabling provision of a virtual object on the panoramic view, wherein enabling provision of the virtual object further comprises associating the virtual object with a corresponding real object within the panoramic view.

9. The method of claim 8, wherein causing the stored image to be displayed comprises selecting the stored image from among a plurality of previously captured images, each of the previously captured images being associated with a corresponding location and orientation.

10. The method of claim 8, wherein causing the stored image to be displayed comprises selecting the stored image from among a plurality of previously captured images pre-fetched from a remote device and locally stored, the images pre-fetched being selected based on a proximity of each pre-fetched image relative to the current location.

11. The method of claim 8, wherein enabling provision of the virtual object comprises replacing a real object with the virtual object or removing the real object.

12. The method of claim 8, wherein receiving information indicative of the orientation of the mobile terminal comprises comparing a reference point in a live image to a prior position of the reference point in a previously captured image or frame.

13. The method of claim 8, wherein receiving information indicative of the current location of the mobile terminal and receiving information indicative of the orientation of the mobile terminal occurs at a device remote with respect to the mobile terminal and wherein causing the stored image to be displayed comprises providing the stored image from the device to the mobile terminal.

14. A computer program product comprising at least one non-transitory computer-readable storage medium having computer-executable program code instructions stored therein, the computer-executable program code instruction comprising program code instructions for:

receiving information indicative of a current location of a mobile terminal;

receiving information indicative of an orientation of the mobile terminal with respect to the current location;

selecting a stored image including a panoramic view of the current location from among a plurality of images of the current location having different lighting conditions, wherein the stored image is selected based upon a current time of day or current weather condition such that the lighting condition of the stored image corresponds to the current time of day or the current weather condition;

causing the stored image including the panoramic view of the current location to be displayed at the mobile terminal based on the orientation; and enabling provision of a virtual object on the panoramic view, wherein program code instructions for enabling provision of the virtual object further include instructions for associating the virtual object with a corresponding real object within the panoramic view.

15. The computer program product of claim 14, wherein program code instructions for causing the stored image to be displayed include instructions for selecting the stored image from among a plurality of previously captured images, each of the previously captured images being associated with a corresponding location and orientation.

16. The computer program product of claim 14, wherein program code instructions for causing the stored image to be displayed include instructions for selecting the stored image from among a plurality of previously captured images pre-fetched from a remote device and locally stored, the images pre-fetched being selected based on a proximity of each pre-fetched image relative to the current location.

17. The computer program product of claim 14, wherein program code instructions for enabling provision of the virtual object include instructions for replacing a real object with the virtual object or removing the real object.

18. The apparatus of claim 1, wherein the memory and computer program code are further configured to, with the processor, cause the apparatus to adjust a scale of the virtual object at least partially in response to a determination that the mobile terminal has moved.

19. The method of claim 8, further comprising adjusting a scale of the virtual object at least partially in response to a determination that the mobile terminal has moved.

20. The computer program product of claim 14, wherein the computer-executable program code instruction further comprise program code instructions for adjusting a scale of the virtual object at least partially in response to a determination that the mobile terminal has moved.

* * * * *